US012609763B2

(12) United States Patent
Corey et al.

(10) Patent No.: US 12,609,763 B2
(45) Date of Patent: Apr. 21, 2026

(54) SATELLITE COMMUNICATION WITH MODULARIZED MOBILE EARTH STATIONS (MESs)

(71) Applicant: VIASAT, INC., Carlsbad, CA (US)

(72) Inventors: Jordan M. Corey, Carlsbad, CA (US); Jimmy Tran, San Diego, CA (US)

(73) Assignee: VIASAT, INC., Carlsbad, CA (US)

( * ) Notice: Subject to any disclaimer, the term of this patent is extended or adjusted under 35 U.S.C. 154(b) by 354 days.

(21) Appl. No.: 18/560,452

(22) PCT Filed: May 12, 2022

(86) PCT No.: PCT/US2022/029067
§ 371 (c)(1),
(2) Date: Nov. 13, 2023

(87) PCT Pub. No.: WO2022/241164
PCT Pub. Date: Nov. 17, 2022

(65) Prior Publication Data
US 2024/0259087 A1 Aug. 1, 2024

Related U.S. Application Data

(60) Provisional application No. 63/188,437, filed on May 13, 2021.

(51) Int. Cl.
*H04B 7/185* (2006.01)

(52) U.S. Cl.
CPC ..... *H04B 7/18519* (2013.01); *H04B 7/18513* (2013.01); *H04B 7/18517* (2013.01)

(58) Field of Classification Search
CPC ........... H04B 7/18519; H04B 7/18513; H04B 7/18517; H04B 7/18523; H04B 7/1853; H04B 7/18576; H04B 7/1851
(Continued)

(56) References Cited

U.S. PATENT DOCUMENTS 4,639,937 A 1/1987 Mcrae et al.
5,555,257 A * 9/1996 Dent ...................... H01Q 1/246
455/452.2
(Continued)

FOREIGN PATENT DOCUMENTS

CN 207015355 2/2018
CN 108974049 1/2021
(Continued)

OTHER PUBLICATIONS

Li, et al., "Dynamic Beacon Mobility Scheduling for Sensor Localization", in IEEE Transactions on Parallel and Distributed Systems, IEEE, USA, vol. 23, No. 8, Aug. 1, 2012 (Aug. 1, 2012) , pp. 1439-1452, XP011455567, ISSN: 1045-9219, DOI: 10.1109/TPDS. 2011.267.
(Continued)

*Primary Examiner* — Mahendra R Patel

(74) *Attorney, Agent, or Firm* — F. CHAU & ASSOCIATES, LLC

(57) ABSTRACT

A communication system includes a plurality of MESs arranged at different locations and operating as a unit to communicate with one or more satellites. One of the MESs is configured in a leader mode and each remaining MES of the MESs is configured in a follower mode based on a result of an auto-negotiation. In the leader mode, the one MES manages combining/dividing of satellite-related signals communicated between the one MES and each of the remaining MESs.

22 Claims, 9 Drawing Sheets

(58) Field of Classification Search
USPC ........................................................ 455/427
See application file for complete search history.

(56) References Cited

U.S. PATENT DOCUMENTS

| | | | | |
|---|---|---|---|---|
| 6,301,231 | B1 * | 10/2001 | Hassan | H04B 7/18534 |
| | | | | 455/13.1 |
| 6,870,816 | B1 | 3/2005 | Edwards et al. | |
| 7,557,748 | B1 | 7/2009 | Zahm et al. | |
| 9,954,601 | B2 | 4/2018 | Buer et al. | |
| 10,015,302 | B2 * | 7/2018 | Linsky | H04M 1/72412 |
| 10,200,109 | B2 | 2/2019 | Feria et al. | |
| 10,673,521 | B1 * | 6/2020 | Beauvilliers | H04B 7/18513 |
| 2002/0009059 | A1 * | 1/2002 | Abutaleb | H04B 7/18593 |
| | | | | 370/278 |
| 2006/0030351 | A1 | 2/2006 | Miller et al. | |
| 2006/0045038 | A1 | 3/2006 | Kay et al. | |
| 2006/0251115 | A1 * | 11/2006 | Haque | H04W 84/22 |
| | | | | 370/466 |
| 2008/0231506 | A1 | 9/2008 | Stull et al. | |
| 2015/0264627 | A1 * | 9/2015 | Perdomo | H04L 67/04 |
| | | | | 370/329 |
| 2017/0047986 | A1 * | 2/2017 | Petrovic | H04B 7/18513 |
| 2018/0324634 | A1 | 11/2018 | Harrington et al. | |
| 2019/0260561 | A1 | 8/2019 | Furuichi | |
| 2021/0143898 | A1 * | 5/2021 | Edge | H04W 36/00837 |
| 2022/0244743 | A1 * | 8/2022 | Ganlath | G06Q 30/0283 |

FOREIGN PATENT DOCUMENTS

| | | |
|---|---|---|
| CN | 112444835 | 3/2021 |
| EP | 3281309 | 10/2019 |
| EP | 3335365 | 12/2019 |
| EP | 3335365 B1 * | 12/2019 ........... H04L 5/1469 |
| JP | 5474886 | 4/2014 |
| WO | 2006136783 | 12/2006 |
| WO | 2010049088 | 5/2010 |
| WO | WO-2020083030 A1 * | 4/2020 ............ H04B 7/185 |
| WO | WO-2021221842 A1 * | 11/2021 ........... H04W 40/24 |

OTHER PUBLICATIONS

Qureshi, et al., "Distributed Coalition Formation in Visual Sensor Networks: A Virtual Vision Approach", Jun. 18, 2007 (Jun. 18, 2007), Distributed Computing in Sensor Systems; [Lecture Notes in Computer Science;; LNCS], Springer Berlin Heidelberg, Berlin, Heidelberg, pp. 1-20, XP019062179, ISBN:978-3-540-73089-7.
International Search Report & Written Opinion dated Sep. 8, 2022 in corresponding PCT Application No. PCT/US2022/029067, 11 pages.
Communication dated Mar. 27, 2025 from the EPO regarding decision to grant a European patent in related application No. 22732713.7-1206, 3 pages.
Communication dated Nov. 18, 2024 from the EPO regarding Communication about intention to grant a Europan patent in related application No. 22732713.7-1206, 5 pages.
Communication dated Nov. 18, 2024 from the EPO regarding text intended for grant (version for approval) in related application No. 22732713.7-1206, 30 pages.

* cited by examiner

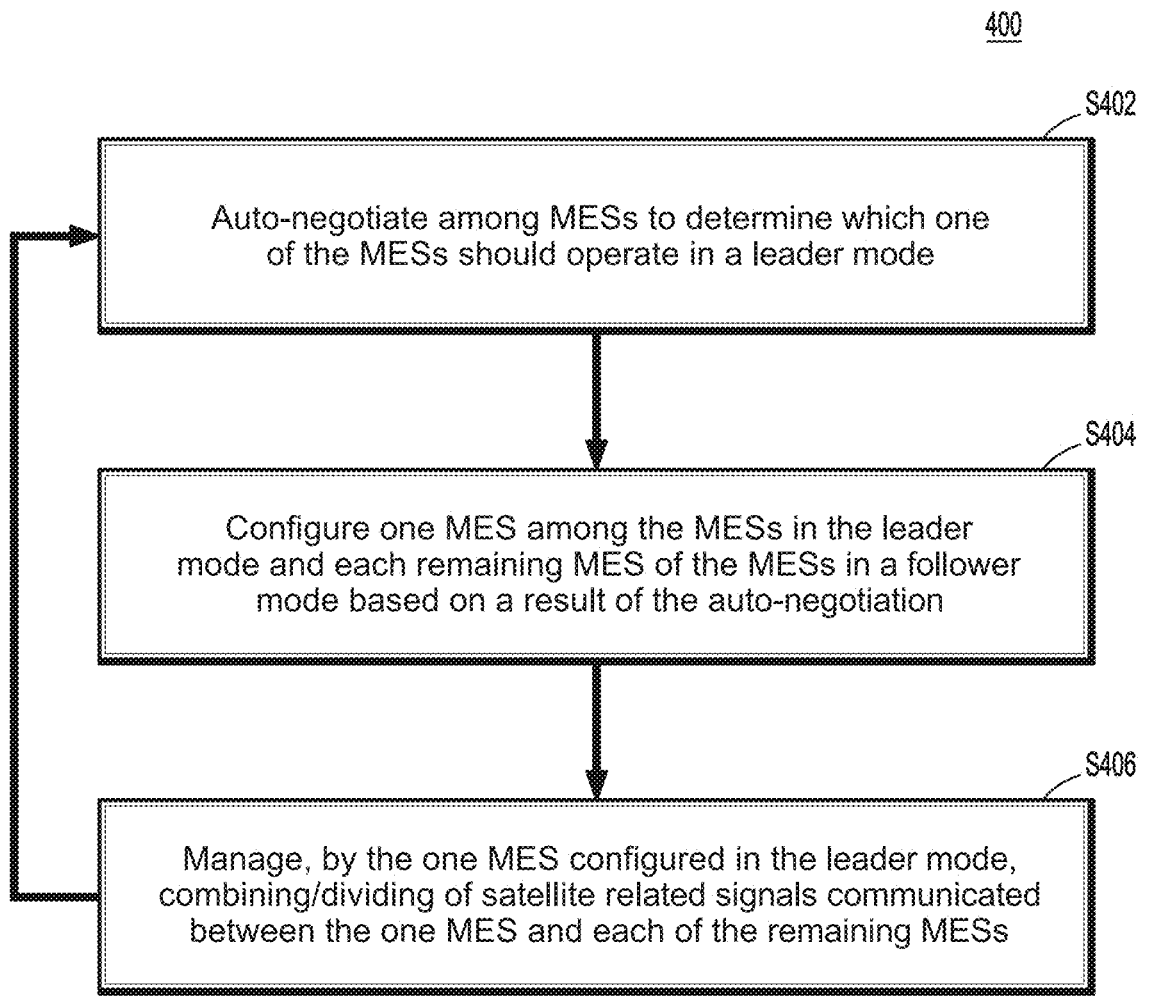

400

S402

Auto-negotiate among MESs to determine which one of the MESs should operate in a leader mode

S404

Configure one MES among the MESs in the leader mode and each remaining MES of the MESs in a follower mode based on a result of the auto-negotiation

S406

Manage, by the one MES configured in the leader mode, combining/dividing of satellite related signals communicated between the one MES and each of the remaining MESs

FIG. 4

SATELLITE COMMUNICATION WITH MODULARIZED MOBILE EARTH STATIONS (MESs)

CROSS REFERENCE TO RELATED APPLICATIONS

This application is a 371 National Stage entry of PCT application no. PCT/US2022/029,067, filed on May 12, 2022, which claims priority to U.S. Provisional Application No. 63/188,437, filed in the U.S. Patent and Trademark Office on May 13, 2021, of which the entire contents of both are incorporated by reference herein.

TECHNICAL FIELD

This disclosure relates generally to satellite communications and more particularly to satellite communication with mobile earth stations (MESs).

DISCUSSION OF RELATED ART

A mobile earth station (MES) is mobile wireless equipment capable of communicating (transmitting and/or receiving) signals to a satellite. An MES can be a hand-held portable wireless device, or a wireless device fixedly mounted to a mobile transporter such as a rail car of a train, a watercraft, a vehicle, or a robot. In some cases, a plurality of MESs are mounted to different locations on a large mobile transporter such a train. By providing a plurality of MESs that may operate individually or together for redundant communication, reliability of communications with one or more satellites may be improved.

SUMMARY

In an aspect of the present disclosure, a communication system includes a plurality of MESs arranged at different locations and operating as a unit to communicate with one or more satellites. One of the MESs is configured in a leader mode and each remaining MES of the MESs is configured in a follower mode based on a result of an auto-negotiation. In the leader mode the one MES manages combining/dividing of satellite-related signals communicated between the one MES and each of the remaining MESs.

In a downlink path, the satellite-related signals may be digital or analog baseband signals derived from downlink satellite signals received by each of the remaining MESs. In an uplink path, the satellite-related signals may also be digital or analog baseband signals, divided by the one MES operating in the leader mode, corresponding to a transmit path uplink data signal provided from end user equipment.

In another aspect, a first MES, among a plurality of MESs arranged at different locations and operational as a unit to communicate with one or more satellites, includes: an antenna for transmitting an uplink signal and/or receiving a downlink signal from the one or more satellites; a transceiver front end coupled to the antenna; a modem for transmitting and/or receiving data signals to/from external end user equipment; memory; and a controller coupled to the transceiver front end and the modem. The controller executes instructions read from the memory to: auto-negotiate with remaining MESs of the plurality of MESs to determine which one of the MESs should operate in a leader mode; configure the first MES in the leader mode and each of the remaining MESs in a follower mode based on a result of the auto-negotiation; and manage, when the first MES is configured in the leader mode, combining/dividing of satellite-related signals communicated between the first MES and each of the remaining MESs.

In another aspect, a method performed by a group of MESs to communicate with one or more satellites includes auto-negotiating among the group of MESs to determine which one of the MESs should operate in a leader mode; configuring one MES of the set in the leader mode and each remaining MES of the MESs in a follower mode based on a result of the auto-negotiation; and managing, by the one MES configured in the leader mode, combining/dividing of satellite related signals communicated between the one MES and each of the remaining MESs.

In still another aspect, a non-transitory computer-readable recording medium stores instructions that, when executed by a controller, cause a first MES, among a plurality of MESs arranged at different locations and operational as a unit to communicate with one or more satellites, to implement the method outlined above.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label with an underscore/dash and second label that distinguishes among the same/similar elements (e.g., _1, _2), or directly annexing the reference label with a second label. However, if a given description uses only the first reference label, it is applicable to any one of the same/similar elements having the same first reference label irrespective of the second label. Elements and features may not be drawn to scale in the drawings.

FIG. 4 is a flow chart outlining an example method of satellite communication with MESs according to an embodiment.

DETAILED DESCRIPTION OF EMBODIMENTS

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Herein, the phrase "communicating signals" (or like forms) encompasses unidirectional and bidirectional communication. Thus, when a first device communicates signals with a second device, the first device transmits signals to and/or receives signals from the second device.

Herein, the phrase "combining/dividing" or like forms means combining and/or dividing.

Herein, the slash symbol "/" connecting two items signifies and/or ("and" or "or"), unless the context indicates otherwise. In other words, both items are present in one example, but only one of the items is present in another example.

Figure 1:
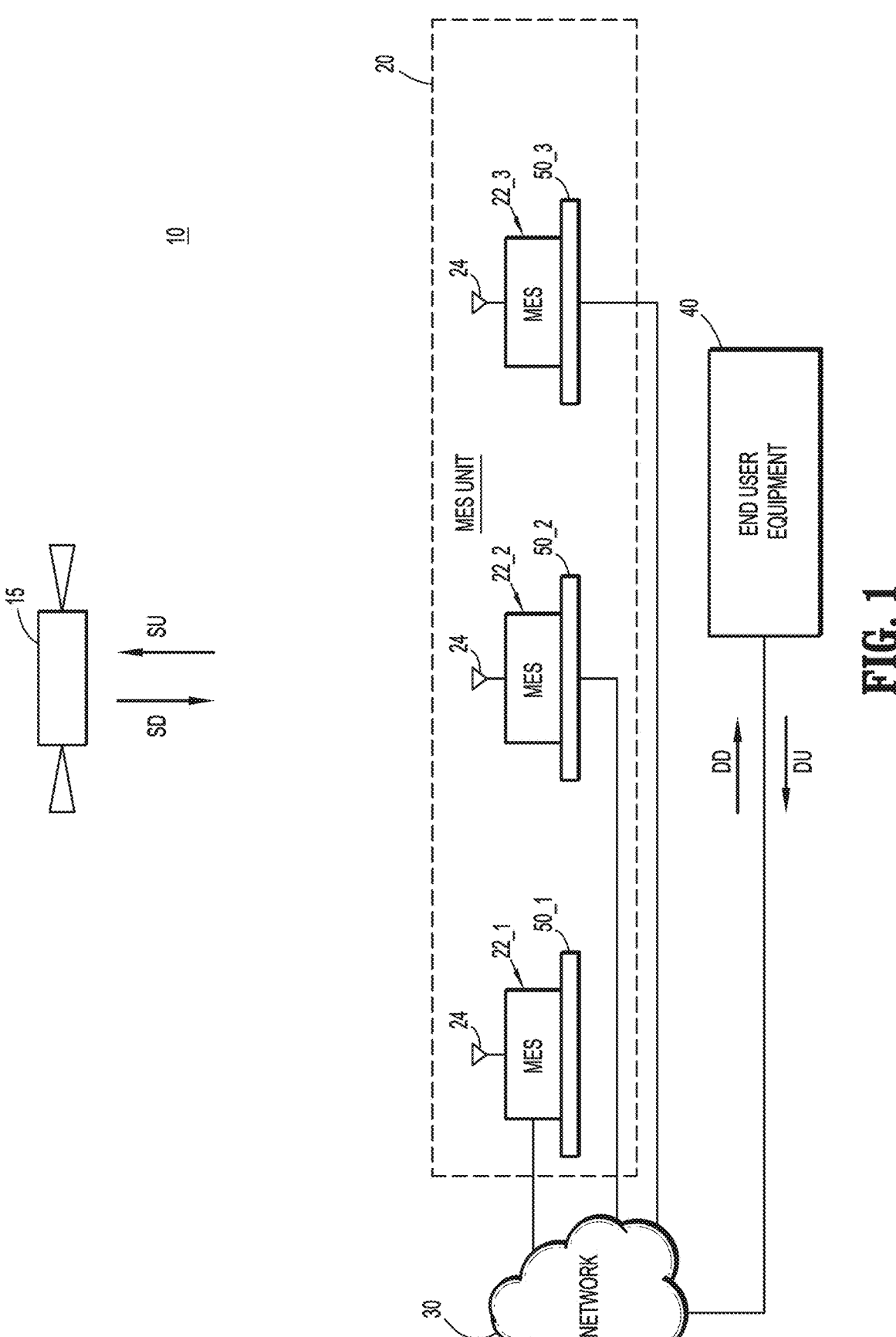
FIG. 1 illustrates a satellite communication system according to an embodiment.

FIG. 1 illustrates a satellite communication system, 10, according to an embodiment. System 10 may include a satellite 15 that communicates over a satellite channel with a group of spatially distributed modularized, self contained MESs, e.g., 22_1, 22_2 and 22_3, that form an MES unit 20 in which MESs 22_1 to 22_3 operate together with respect to satellite 15. Although one satellite 15 and three MESs are illustrated and described, MES unit 20 may concurrently communicate with at least one other satellite over another satellite channel in the same way as described below for satellite 15. Further, although three MESs are illustrated and described, MES unit 20 may have exactly two MESs, or four or more MESs in other embodiments. At any given time, MESs 22_1, 22_2 and 22_3 may be located on different mobile transporters 50_1, 50_2 and 50_3, respectively, which may be different locations of a common transporter such as a train or vessel. In other examples, transporters 50_1 to 50_3 are different vehicles, different robots, different humans (for hand-held or wearable MESs), and so forth.

Some examples of satellite 15 include a low earth orbit (LEO) satellite, a medium earth orbit (MEO) satellite, a geosynchronous equatorial orbit (GEO) satellite, or an elliptical orbit satellite. The types of data communicated between satellite 15 and MES unit 20 may include Internet-generated data, private network based data, navigational data, weather data, scientific data, and application data. Satellite 15 may be communicatively connected to a ground station (not shown) and act as a transponder to route data between the ground station and MES unit 20.

Satellite 15 may transmit a downlink signal SD to MESs 22 and/or receive an uplink signal SU from at least one of the MESs 22. MES unit 20 may be transparent to satellite 15 in the sense that satellite 15 may operate as though it is communicating with a single MES 22. To this end, on downlink, satellite 15 may transmit a single signal SD intended for a single MES 22 following an identification exchange, without knowing that the signal SD is received and processed at multiple MESs. The signal SD may be received by each of the MESs 22_1 to 22_3. MESs 22 may be communicatively coupled with one another through a network 30, e.g., a wireless or wired (electrical or optical) local area network (LAN), or an ad hoc network. The downlink signals received by each of the MESs 22 may be shared over network 30 between the MESs 22, and combined, to obtain a composite signal of higher quality and reliability than that realizable with just a single MES 22. The combined signal may be processed (e.g., downconverted and demodulated) by one or more of the MESs 22 to generate a composite data signal DD that is output to end user equipment (EUE) 40. Some examples of EUE 40 include a stand-alone computer(s) coupled to a monitor (e.g., for use by a central operator of transporter 50 for real time communication with respect to transporter 50); mobile devices for end users on transporter 50 connected to the Internet via the satellite system 10; or a data storage system to collect satellite data for later use.

As an example, an obstacle may exist between MES 22_1 and satellite 15 causing line-of-sight blockage that reduces receive signal quality at MES 22_1. However, no such obstacle may exist between the other MESs 22_2 and 22_3 and satellite 15. In this case, MES unit 20 may generate a composite receive signal comprised primarily of the receive signals from MESs 22_2 and 22_3, whereby receive signal quality of the composite receive signal may still be satisfactory. On the other hand, if MES 22_1 was the sole MES handling the satellite communication in this scenario, receive signal quality might be temporarily unsatisfactory.

Similarly, for uplink signal transmissions, in some embodiments satellite 15 may have initially set up a communication session with a single MES 22_i of MES unit 20. This may have occurred via an initial handshake in which an identifier for MES_i was received in a frame of an uplink signal. Thereafter, MESs 22_1 to 22_3 may each transmit a shifted and/or weighted portion of the same uplink signal in a synchronized fashion, which synchronously arrive to form a composite uplink signal SU at satellite 15. (A similar scheme could also be used for the uplink handshake signals.) Satellite 15 may not, and need not, recognize that the actual source of the uplink signal is a plurality of MESs each transmitting a portion of the signal. Thus, the contributions of the other MESs (i.e., other than MES_i) may be transparent to satellite 15.

In other embodiments, such individual portions of uplink signals are not transmitted by multiple MESs 22, such that only a single MES 22 transmits the uplink signal. In this case, however, if an obstacle is detected to exist between the transmitting MES and satellite 15 (e.g., through detection of a reduced signal quality in a received downlink signal from satellite 15) then the transmitting MES 22 may be switched to another one of the MESs 22.

In system 10, an auto-negotiation may be performed by the MESs 22 of MES unit 20 to determine which one of the MESs 22 should be configured in a "leader mode". To this end, a wide variety of leader election algorithms could be used, of which some examples employ features such as time-based leases and heartbeat communication for lease refresh.

At any given time, as a result of the auto-negotiation, a single one of the MESs 22 of MES unit 20 may be configured in the leader mode, and the remaining MESs 22 of MES unit 20 may each be configured in a "follower mode". Hereafter, an MES 22 configured in the leader mode may be referred to as the leader MES 22_i (i=any integer from 1 to N in an MES unit 20 having N MESs), and any MES 22 configured in the follower mode may be referred to as a follower MES. The leader MES 22_i may manage combining/dividing of satellite-related signals communicated between the leader MES 22_i and each of the remaining MESs 22 (the follower MESs). On downlink, a satellite-related signal of any MES 22_j (j=1 to N) may be a baseband signal derived from the portion of the downlink signal SD received by that MES 22_j. On uplink, a satellite-related signal may loosely refer to either a signal derived from the uplink data signal DU, or a signal derived from a divided portion of the uplink data signal DU.

Each MES 22 of MES unit 20 includes a respective antenna 24, which may be a fixed antenna forming a fixed beam pattern and pointing direction. Alternatively, antenna 24 forms a steerable beam and/or a dynamically adjustable beam shape, which may be steered electronically or mechanically. In the case of electronic steering, any antenna 24 may be a phased array. In any case, when MESs 22_1 to 22_3 operate as an MES unit 20 to combine received portions of downlink signal SD and/or transmit respective portions of uplink signal SU, they may be understood to form a "terminal array" in which a virtual antenna has a larger effective aperture than any of the individual antennas 24.

MES unit 20 may be configured in various embodiments for: (i) digital combining/beamforming and/or analog combining/beamforming of uplink/downlink signals; (ii) auto-discovery/auto-configuration; (iii) use as a standalone unit or for adding additional assemblies to improve upon individual MES effective aperture size under nominal conditions, thereby improving overall spectral efficiency; (iv) allowing for a larger effective aperture (collectively formed by all of the MESs) to be installed under varying MES platform space constraints; and/or (v) ease of use and increased availability.

When MES unit 20 is configured with analog combining/beamforming, functionality may be included for individually adjusting the amplitude and phase of a plurality of RF signals, sent to/received from the MESs 22_1 to 22_3 via analog techniques, in order to maximize receive signal strength and transmit signal strength as desired. This may involve intra-MES analog combining and/or inter-MES analog combining. Intra-MES analog combining may be implemented when antenna 24 is embodied as a phased array. In this case, per-element analog gain/phase adjustments and intra-MES combining may be made within each individual MES 22 via analog mechanisms to steer/adjust a beam formed by that MES (for uplink/downlink beams). Inter-MES combining may be implemented after down-conversion for downlink signals, and/or prior to upconversion for uplink signals. (See, e.g., FIG. 7.)

When MES unit 20 is configured with digital combining/beamforming, functionality may be included for individually adjusting the amplitude and phase of a plurality of RF signals, sent to/received from the MESs 22_1 to 22_3 via digital signal processing techniques, in order to similarly maximize the receive signal strength and transmit signal strength as desired. When antenna 24 of an MES 22_j is a phased array, the digital combining may include optimal digital combining across a plurality of sub-arrays of the phased array. Additionally or alternatively, the digital combining is inter-MES combining. On downlink, the inter-MES digital combining may occur with respect to received satellite signals after downconversion and sampling. On uplink, the inter-MES combining may occur with respect to uplink data signals after modulation and prior to upconversion. (See, e.g., FIG. 7.)

MES unit 20 may also be configured with hybrid analog and digital combining functionality. For example, an MES

22_j may include intra-MES analog combining functionality as described above, as well as the above-described inter-MES digital combining functionality.

MES unit 20 may be configured with auto-discovery functionality ("auto-discovery"). With auto-discovery, MESs 22_1 to 22_3 may establish communications among themselves upon power-up via network 30. One way to perform auto-discovery is by incorporating use of broadcast heartbeat messages at regular periodic intervals (e.g. 1/second) from each of the MESs 22 (or from at least the leader MES 22 if already established). Upon start-up, an MES 22 may listen for broadcast messages and determine which messages are part of the leader-election process and/or which messages identify an existing leader MES. For instance, an auto-discovery protocol used by the MESs may dictate that a first predetermined value within a field of a heartbeat message frame is indicative of a leader-election process message. However, if a leader has already been established, a second value within the same or different field or frame may identify the current leader. Auto-discovery may further enable configuration files to be automatically loaded to a newly added MES 22, and signals from the newly added MES may be optimally combined with those of the existing MESs 22_1 to 22_3. Auto-discovery may improve overall reliability by allowing a newly added MES 22 to become a new leader MES if the current leader MES fails.

MES unit 20 may further include auto-configuration functionality ("auto-configuration"). With collective auto-configuration and auto-discovery functionality, MESs 22_1 to 22_3 may establish communications with one another upon power-up via network 30. Further, any newly added MESs may be automatically configured (initially) as a follower MES.

With auto-configuration, configuration data may be replicated over connected MESs 22. For example, the leader MES may provide the configuration data to the follower MESs. In addition, MESs 22 may send status signals to one another, such as "keep alive" messages requesting to be maintained as an active MES within MES unit 20. Further, a failed leader MES 22 may be automatically replaced by another MES 22.

Figures 2, 3:
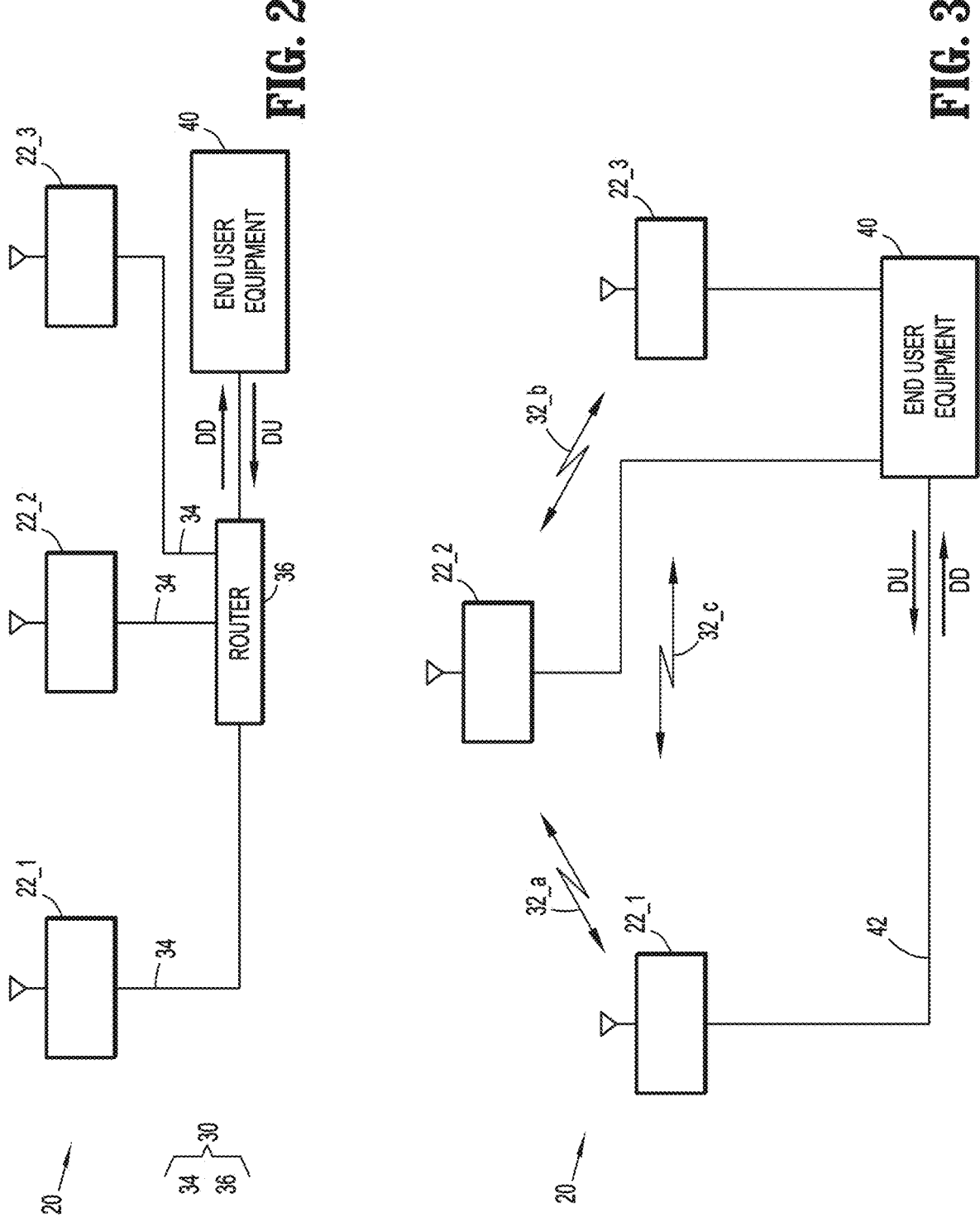
FIG. 2 depicts an example of a local area network (LAN) connection between MESs within the satellite communication system.
FIG. 3 depicts an example of an ad hoc network connection between MESs within the satellite communication system.

FIG. 2 depicts an example of a local area network (LAN) connection between MESs within the satellite communication system. Here, an example of network 30 includes a LAN router 36 and a LAN links 34, each connecting a respective one of MESs 22_1 to 22_3 to LAN router 36. Links 34 may each be a wireless link (e.g., using IEEE 802.11 technology or Bluetooth®), or a wired link, e.g., an electrical or optical link employing Ethernet technology. Any other suitable type of LAN technology may be implemented. Command signals and data signals for the above-discussed auto-negotiation, auto-discovery and auto-configuration operations may be communicated among the MESs 22 of MES unit 20 under control of LAN router 36 through LAN links 34. In addition, the above-noted satellite-related signals may be communicated among the MESs 22 through LAN router 36 and links 34 in the same manner. Router 36 may also be coupled to end user equipment (EUE) 40 and route uplink data signal DU from EUE 40 to the leader MES 22_i and/or route downlink data signal DD from the leader MES 22_i to EUE 40.

FIG. 3 depicts an example of an ad hoc network connection between MESs within the satellite communication system. Here, network 30 may be formed by ad hoc network processing circuitry within each of MESs 22 and a wireless communication interface within each of MESs 22. These circuits may form a wireless link 32_a between MES 22_1 and 22_2; a wireless link 32_b between MES 22_2 and 22_3; and a wireless link 32_c between MES 22_1 and 22_3. End user equipment 40 may be coupled to each of MESs 22 through a respective wireless or wired link 42, to receive downlink data signal DD and/or transmit uplink data signal UD to one or more of the MESs 22. In an embodiment, signals DD and UE are communicated just between the leader MES 22_i and EUE 40 over the link 42 therebetween.

FIG. 4 is a flow chart outlining an example method 400 of satellite communication between a group of MESs and one or more satellites according to an embodiment. Method 400 is discussed below in connection with the above-described communication system 10. With method 400, an auto-negotiation operation (S402) among all MESs 22_1 to MES 22_3 of the group of MESs forming MES unit 20 may take place to determine which one of the MESs should operate in a leader mode (where the remaining MESs would operate in the follower mode). Based on a result of the auto-negotiation, an auto-configuration operation occurs (S404) in which one MES 22_i among the MESs is configured in the leader mode (thereby becoming the designated leader MES 22_i) and each remaining MES 22 of the group of MESs is configured in the follower mode.

Once so configured, the leader MES 22_i manages combining/dividing of satellite-related signals communicated between itself and the remaining MESs. Examples of such management are presented below. In general, the management may involve, on downlink, commanding the remaining MESs 22 to transmit their satellite-related signals to the leader MES 22_i and performing digital/analog combining of all the satellite-related signals. The management may also involve generating and transmitting synchronization/timing signals to the remaining MESs to facilitate phase adjustment of the satellite-related signals sufficient to realize a virtual array. The management may involve analogous operations for uplink signals.

The flow then returns to operation S402, where the operations may be repeated, such that the auto-negotiation may be ongoing throughout the operation of MES unit 20. For instance, when all the MESs 22 of MES unit 20 are first powered up, an auto-negotiation engine running within each of the MESs may recognize that one of the MESs is designated to be an initial leader MES by default. Thereafter, if the leader MES fails, one of the remaining MESs 22 may be selected as the new leader MES. To this end, each of the MESs, including the leader MES 22_i, may be configured to transmit status messages to one or more of the other MESs 22, where a status indicating a "keep alive" state for any given MES 22_j may indicate that the MES 22_j is operating satisfactorily. If, however, the status message transmitted by the leader MES 22_i indicates that its operations no longer meet predetermined specifications (or status messages are no longer being transmitted), then the auto-negotiation operation S402 may immediately select a new leader MES.

Another example may involve a scenario in which only MES 22_i (e.g., the leader MES) is designated to transmit an uplink signal satellite 15. In this case, the one MES 22_i may continually monitor its link condition with satellite 15 by monitoring receive signal quality of downlink signals. If the receive signal quality falls below a first threshold due to the presence of an obstacle or other reason, MES_i may inform the other MESs, whereupon the auto-negotiation operation S402 may select a new MES 22_j to perform the uplink signal transmitting (e.g., if the receive signal quality of the new MES 22_j is above a second threshold, where the second threshold may be set higher than the first threshold). The new MES 22_j may also reconfigure as the leader MES while the previous leader MES 22_i may reconfigure as a follower MES.

Figure 5A:
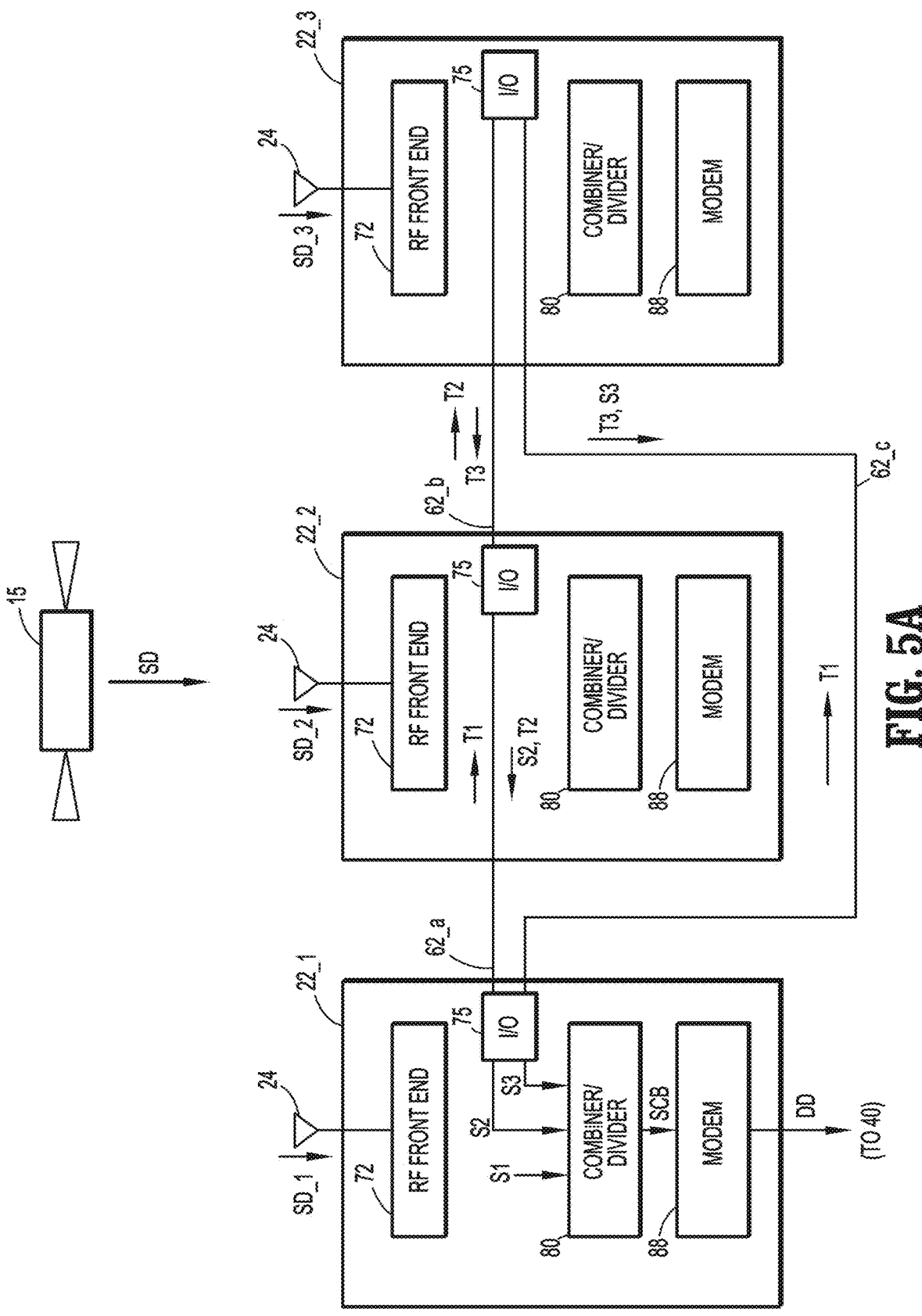
FIG. 5A illustrates example signal flow between MESs in the satellite communication system of FIG. 1, during reception of downlink signals.

FIG. 5A illustrates example signal flow between MESs in the satellite communication system of FIG. 1, during reception of downlink signals. When satellite 15 transmits downlink signal SD, MESs 22_1, 22_2 and 22_3 may receive the downlink signal as a received downlink signal SD_1, SD_2 and SD_3, respectively, and derive respective satellite-related signals S1, S2 and S3 therefrom. Each MES 22 may include an RF front end 72 (e.g., a transceiver front end) coupled to its associated antenna 24; a combiner/divider 80; a modem 88; and an input/output (I/O) interface 75.

In the example of FIG. 5A, MES 22_1 is the leader MES and the remaining MESs, MES_2 and MES_3, are follower MESs. In a digital combining embodiment, combiner/divider 80 operates in the digital domain and signals S1-S3 are digital signals (understood as baseband signals) obtained after sampling of analog baseband signals output by RF front end 72 (discussed further below in connection with FIG. 6A). Signals S2 and S3 may be sent from MESs 22_2 and 22_3 to MES_1 over links 62_a and 62_c, respectively, of network 30. These links may be wireless links such as 32_a and 32_c of an ad hoc network described earlier, or wired/wireless links 34 coupled to a LAN router 36 (although shown directly connected between MESs 22 in FIG. 5A for simplicity). Another link 62_b may similarly communicatively couple MESs 22_2 and 22_3.

Links 62_a to 62_c may also carry control/data signals T1, T2 and T3 between associated MESs. Any of signals T1-T3 may include status signals such as keep alive signals; signal quality metric signals to inform other MESs 22 of the downlink signal quality received at any given MES 22_j; device identification signals; auto-negotiation signals communicated during the above-discussed auto-negotiation operations; auto-discovery signals communicated during the above-discussed auto-discovery operations; and so forth. Signal T1 from leader MES 22_1 may further include configuration data to enable/facilitate communication with satellite 15, such as channel configuration data, e.g., tuning, center frequency, bandwidth and/or symbol/sample rate data associated with an allocated channel(s) for communication between satellite 15 and MES 22_1. Such configuration data may have been obtained by the leader MES 22_1 during an initial communication exchange with satellite 15.

Signals S1-S3 are alternatively analog signals output directly by RF front end 75, in which case combiner/divider 80 operates in the analog domain to combine signals prior to sampling. In either case (digital or analog combining), combiner/divider 80 of the leader MES 22_1 may output a combined signal SCB, and modem 88 may demodulate signal SCB to derive downlink signal DD therefrom and output the same to end user equipment (EUE) 40.

Figure 5B:
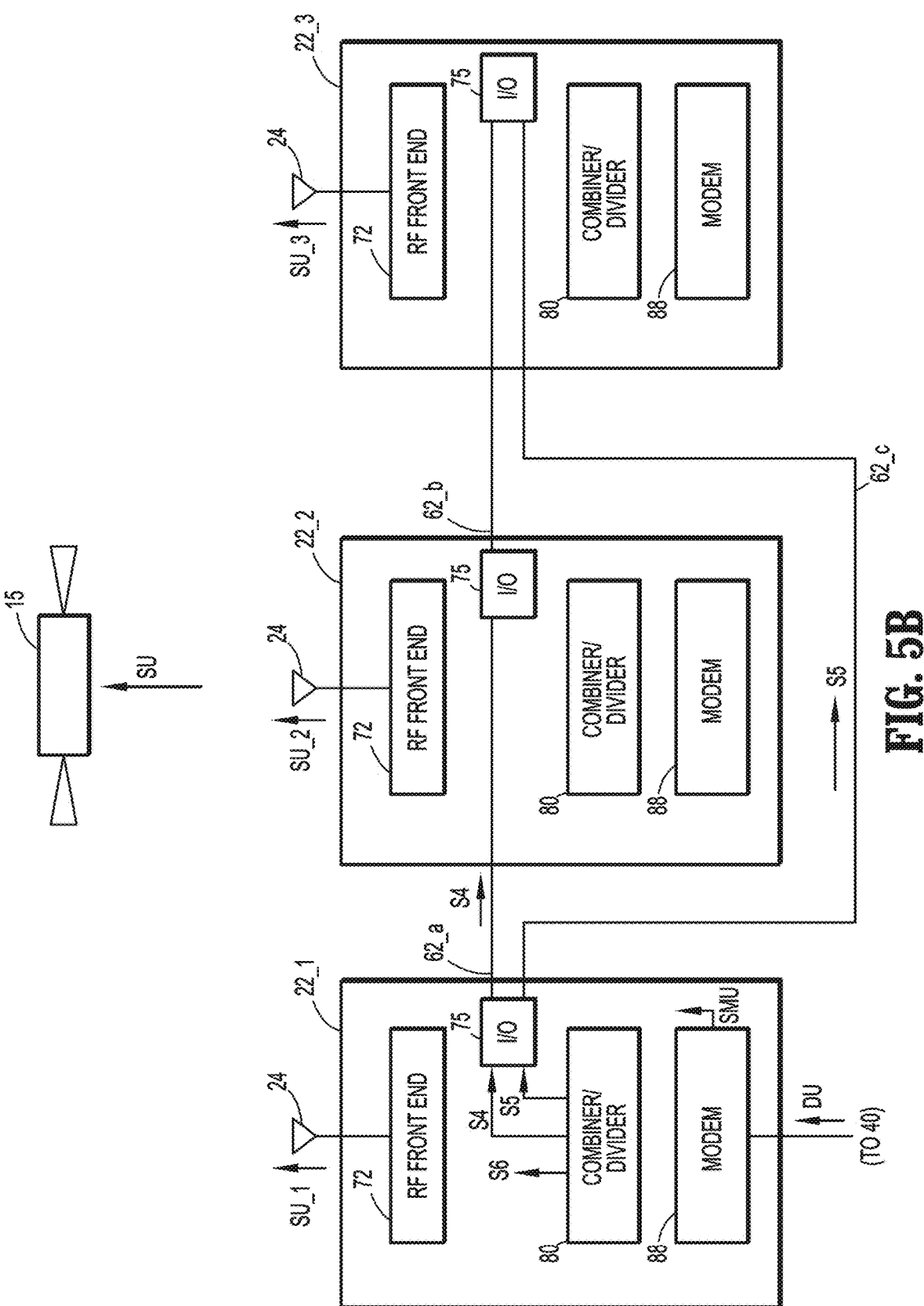
FIG. 5B illustrates example signal flow between MESs in the satellite communication system of FIG. 1, during transmission of uplink signals.

FIG. 5B illustrates example signal flow between MESs in the satellite communication system of FIG. 1, during transmission of uplink signals. (Signals T1-T3 are not shown in FIG. 5B but may be similarly exchanged between MESs 22 over links 62_a to 62_c as described above.) Modem 88 of leader MES 22_1 may receive uplink data signal DU from EUE 40, modulate the same to generate an uplink modulated signal SMU. Signal SMU may be output to combiner/divider 80 of MES 22_1, where it may be divided into divided signals S4, S5 and S6. In a digital combining embodiment, the dividing may occur prior to sampling within MES 22_1. In an analog combining embodiment the dividing may occur after sampling. Divided signals S4 and S5 may be routed to through I/O's 75 to respective RF front ends 72 of MESs 22_2 and 22_3, whereas signal S6 may be routed to RF front end 72 of MES 22_1. RF front ends 72 of MESs 22_1, 22_2 and 22_3 may then generate uplink signals SU_1, SU_2 and SU_3, respectively, which may be synchronously transmitted so as to combine at satellite 15 into a composite uplink signal SU. Signal SU may have higher signal strength and better signal quality characteristics as compared to transmitting an uplink signal from only one of MESs 22.

Figure 6A:
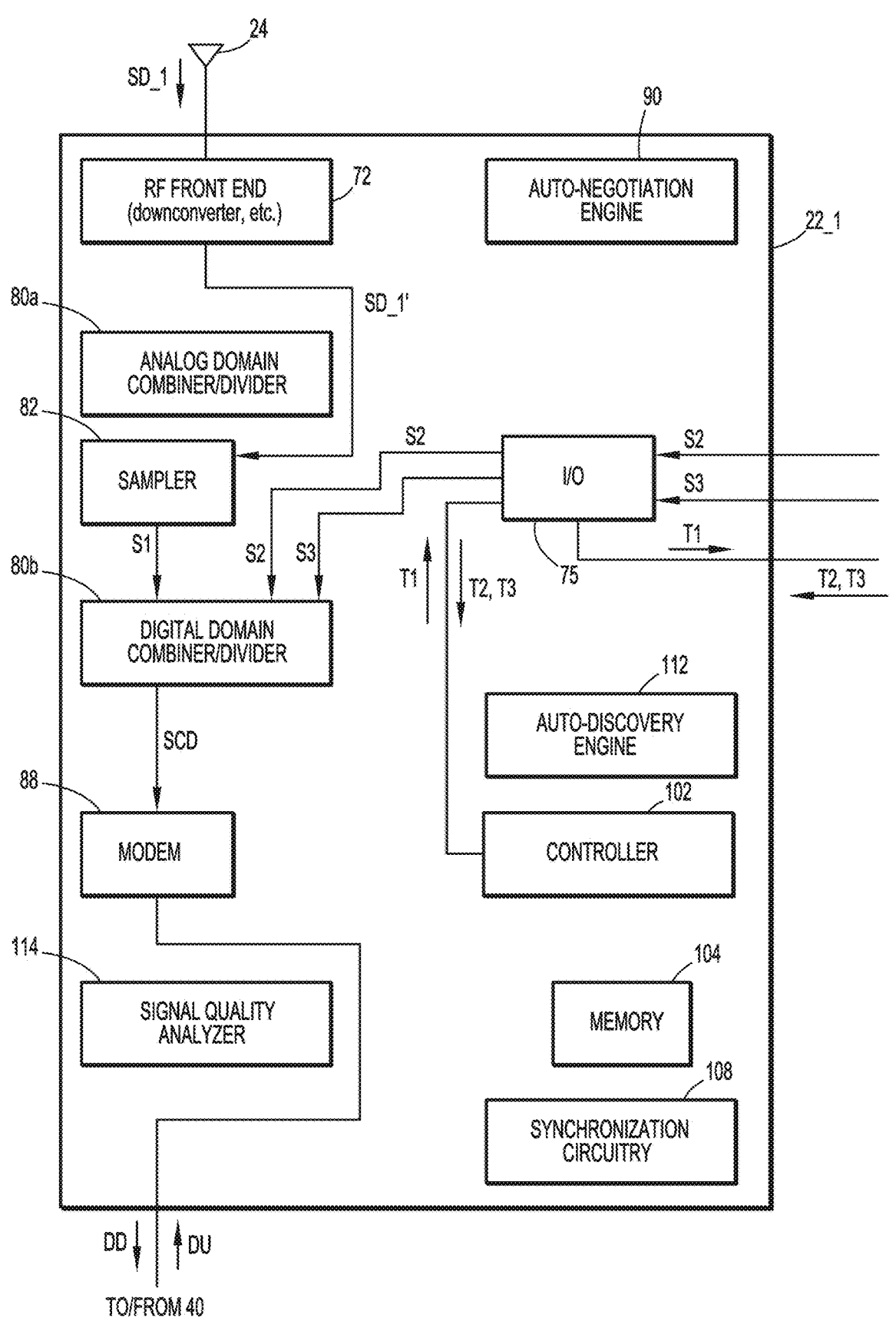
FIG. 6A is an example functional block diagram of an MES configured to communicate baseband signals with other MESs in the satellite communication system, according to an embodiment.

FIG. 6A is an example functional block diagram of an MES configured to communicate baseband signals with other MESs in the satellite communication system, according to an embodiment. In this example, digital baseband signals (an example of satellite-related signals) are communicated between MESs, and combining/dividing of satellite-related signals occurs in the digital domain. A downlink example will be discussed hereafter. Analogous operations may occur for uplink signals. In FIG. 6A, example functional components are shown for MES 22_1, assumed to be operating in the leader mode. Each of the remaining MESs 22 may include similar components, and may operate in the same way when designated as a leader MES. Each MES 22 may include an RF front-end 72, a sampler 82, a digital domain combiner/divider 80*b*, a modem 88, an I/O interface 75, a controller 102, a memory 104, an auto-negotiation engine 90, an auto-discovery engine 112, a signal quality analyzer 114, synchronization circuitry 108, and an analog domain combiner/divider 80*a*. In other embodiments, one or more of these components may be omitted. Although shown separately, some of these components (e.g., 90, 112, 114, 88, 80*b*, and/or 108) may be combined within a single processing device, e.g., a processor of controller 102 executing instructions to carry out their functionality.

RF front-end 72 may include a downconverter to down-convert downlink signals, and an upconverter to up-convert uplink signals; filters; amplifiers; etc. RF front end 72 may process (e.g., down-convert, filter, amplify, etc.) downlink signal SD_1 received from antenna 24 to derive a satellite-related signal SD_1'. This signal may be sampled by sampler 82 to derive a sampled signal S1. RF front ends 75 and samplers 82 of the remaining MESs 22 may similarly derive sampled signals S2 and S3. Digital domain combiner/divider 80*b* may combine signals S1-S3 in the digital domain to thereby generate a combined digital signal SCD. Signal SCD may be output to modem 88, which demodulates the same to generate downlink data signal DD.

Controller 102 may control/coordinate overall operations of MES 22, such as the auto-configuration operations and ad hoc network formation operations described earlier. Controller 102 may also serve to manage the combining/dividing operations of MES unit 20. For example, when MES 22_1 is a leader MES, controller 102 of MES 22_1 may manage the combining/dividing by sending commands to combiner/divider 80 of MES 22_1 to carry out the combining/dividing; and sending commands to the other MESs to send their satellite-related signals S2, S3 to MES 22_1. When MES 22_1 is a follower MES, the combiner/divider 80 of another MES 22 may perform the combining/dividing and the management thereof. Controller 102 may also coordinate other processing-related functions described herein such as the auto-negotiation, auto-discovery, signal quality analysis, modem, synchronization and I/O interface operations. The latter may involve coordinating the exchange of status signals, auto-negotiation signals, auto-discovery signals (e.g., heartbeat signals), configuration data, satellite-related signals, etc. with the other MESs. Controller 102 may include a processor/control logic to implement its functionality. Processing circuitry within controller 102 may also execute instructions read from memory 104 to perform at least some of its functions. Auto-negotiation engine 90 may perform the auto-negotiation operations of method 400 discussed earlier. Similarly, auto-discovery engine 112 and signal quality analyzer 114 may perform the above-discussed auto-discovery and signal quality measurement operations, respectively. Synchronization circuitry 108 of leader MES 22_1 may generate synchronization signals (e.g., included in a field of signal T1) transmitted to the other MESs 22 of MES unit 20, to enable synchronization of the downlink satellite-related signals S1-S3. This may allow signals S1-S3 to be coherently generated and combined, and thereby improve overall signal quality/reliability of MES unit 20.

Figure 6B:
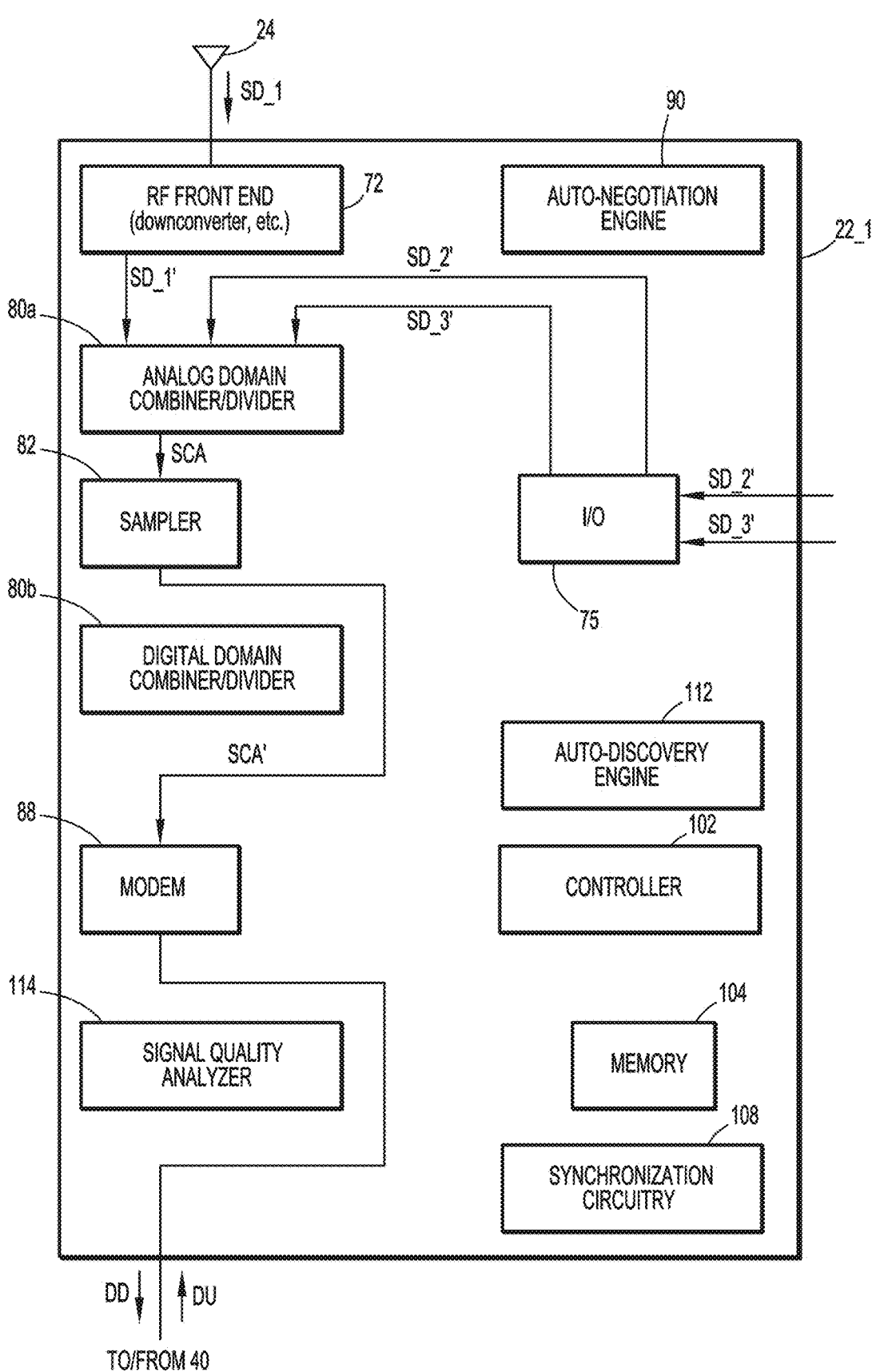
FIG. 6B is an example functional block diagram of an MES configured to communicate radio frequency (RF) signals with other MESs in the satellite communication system, according to an embodiment.

FIG. 6B is an example functional block diagram of an MES configured to communicate RF signals with other MESs in the satellite communication system, according to an embodiment. In this example, analog baseband signals (another example of satellite-related signals) are communicated between MESs, and combining/dividing of satellite-related signals occurs in the analog domain. A downlink example will be discussed hereafter. Analogous operations may occur for uplink signals.

As shown in FIG. 6B, satellite-related signals SD_2' and SD_3' may be derived by MESs 22_2 and 22_3 in the same or similar manner as signal SD_1'. Signals SD_1' to SD_3' may be input to analog combiner/divider 80*a*, which coherently combines the same to generate a combined analog signal SCA. Signal SCA may then be sampled by sampler 82 to generate a sampled signal SCA', which is applied to modem 88. Modem 88 may then generate downlink data signal DD from sampled signal SCA'. Analogous operations may occur for dividing and transmitting uplink signals.

Figure 7:
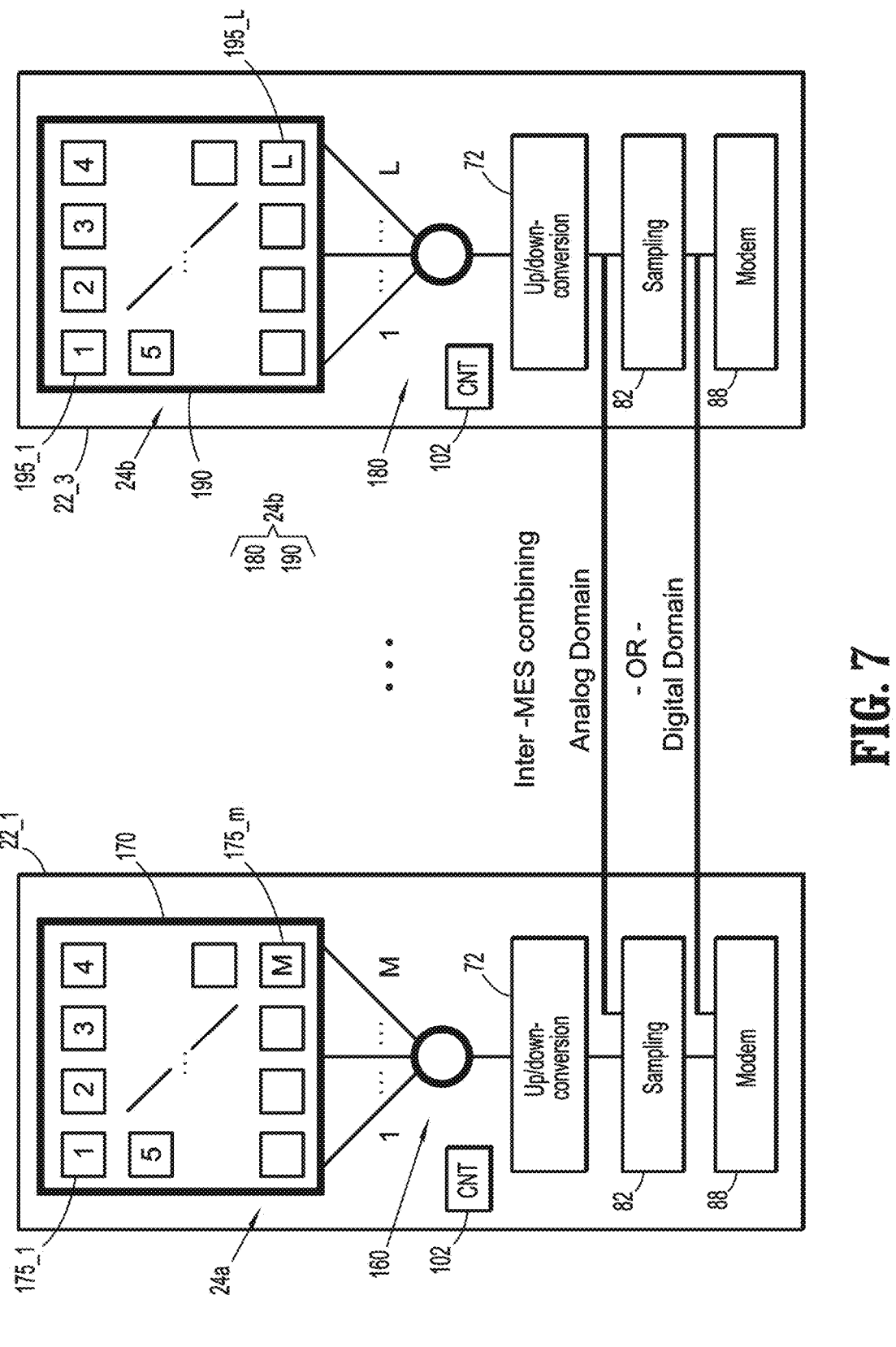
FIG. 7 depicts example electronically steered antennas that may be used within respective MESs according to an embodiment.

FIG. 7 depicts example electronically steered antennas that may be used within respective MESs according to an embodiment. Here, MESs 22_1 and 22_3 are shown to include electronically steered antenna 24*a* and 24*b*, respectively, such as a phased array. Antenna 24*a* includes a linear or planar array 170 of M antenna elements 175_1 to 175_M, and a 1:M RF combiner/divider 160. Antenna 24*b* includes a linear or planar array 190 of L antenna elements 195_1 to 195_L, and a 1:L RF combiner/divider (C/D) 180, where L may differ from M. Phase shifters and/or variable amplifiers (not shown) may be included within array 170 and/or C/D 180 to achieve beam steering/dynamic beam pattern formation under the control of control signals provided by controller 102 of MES 22_1. Similarly, controller 102 of MES 22_3 may provide control signals to phase shifters/amplifiers of antenna 24*b* to realize beam steering/dynamic beam pattern formation. FIG. 7 also illustrates that inter-MES combining may occur in the analog domain and/or the digital domain, as described above.

Figure 8:
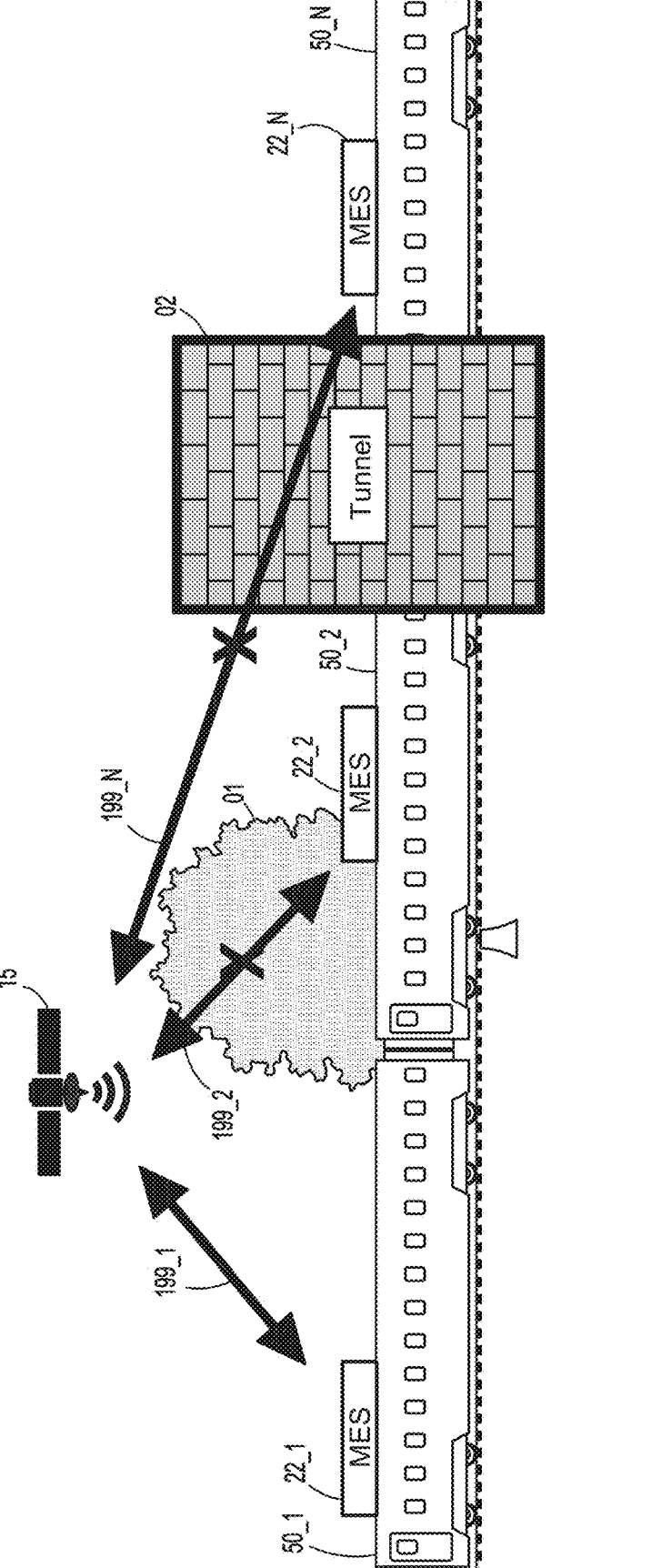
FIG. 8 illustrates an application of the satellite communication system in which MESs are located on different rail cars of a train.

FIG. 8 illustrates an application of the satellite communication system in which MESs are located on different rail cars of a train. In this example, MESs MES_1, MES_2 and MES_N (N=3 or higher) are located on different respective rail cars 50_1, 50_2 and 50_N, and communicate signals with satellite 15 over line-of-sight links 199_1, 199_2 and 199_N, respectively. However, if obstacles such as O1 (a tree) or O2 (a tunnel) interrupt the line-of-sight links, receive signal quality of downlink signals to respective MESs may fall below an acceptable threshold (e.g., the "first threshold" discussed earlier). In an embodiment in which only a single MES, e.g., MES 22_3 of MES unit 20, is designated (and thereby configured) to transmit uplink signals, if the receive signal quality falls below the first threshold, a different MES, e.g., MES_1 in FIG. 8 (with a received signal quality metric above a second threshold) may be re-selected as the transmitting MES. The transmitting MES 22 may also be designated as the leader MES 22. Some examples of a signal quality metric include absolute receive signal level, signal to noise ratio (SNR), signal to interference and noise (SINR), Energy per bit/Noise-spectral density (EbNo), Energy per symbol/Noise-spectral density (EsNo), Error Vector Magnitude (EVM), Bit Error Rate (BER), and any combination thereof.

The various illustrative logical blocks, engines, and circuits described in connection with the present disclosure may be implemented or performed with processing circuitry within any of the MESs 22 (e.g., within controller 102), that may read and execute instructions from a non-transitory recording medium (e.g., memory 104). The processing circuitry may include a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, functions described above may be implemented using hardware, software, firmware, or any combination thereof. If implemented in software, the functions may be stored as one or more instructions or code on a non-transitory computer-readable medium (e.g., memory 104). Examples of a computer-readable medium include both computer storage media and communication media including any medium that facilitates transfer of a computer program from one place to another. A storage medium may be any available medium that can be accessed by a computer/processing circuitry. Examples of such computer-readable media include RAM, ROM, EEPROM, CD-ROM or other optical disc storage, magnetic disc storage or other magnetic storage devices, or any other medium that can be used to store desired program code in the form of instructions or data structures and that can be accessed by a computer/processing circuitry.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A communication system comprising:
a plurality of mobile earth stations (MESs), each including an antenna for direct communication with a satellite, a transceiver front end coupled to the antenna, a modem for transmitting and/or receiving data signals to/from external end user equipment, memory, and a controller, coupled to the transceiver front end and the modem, operative to execute instructions read from the memory, the plurality of MESs being arranged at different locations and operating as a unit to communicate with one or more satellites, wherein one MES of the plurality of MESs is configured in a leader mode and each remaining MES of the MESs is configured in a follower mode based on a result of an auto-negotiation among the plurality of MESs, wherein in the leader mode the one MES manages coherent combining/dividing of satellite-related signals communicated between the one MES and each of the remaining MESs, wherein the auto-negotiation is an initial auto-negotiation when the unit is initialized, and the result of the auto-negotiation is a determination that the one MES is to be initially configured in the leader mode by default, and wherein the one MES operating in the leader mode is configured to provide, to the remaining MESs, satellite channel configuration data including tuning, center frequency and/or symbol rate data.

2. The communication system of claim 1, wherein:
the one MES manages combining of the satellite-related signals, and each of the satellite-related signals is a baseband signal derived from a downlink satellite signal received by an associated remaining MES.

3. The communication system of claim 2, wherein the combining is performed in the digital domain.

4. The communication system of claim 2, wherein combining is performed in the analog domain.

5. The communication system of claim 1, wherein the one MES further manages dividing an uplink signal into a plurality of divided uplink signals and each of the plurality of MESs is configured to transmit a respective uplink signal derived from a respective one of the divided uplink signals.

6. The communication system of claim 1, further comprising a local area network (LAN), the plurality of MESs being communicatively coupled to one another through the LAN.

7. The communication system of claim 1, wherein each of the plurality of MESs comprises a controller including ad hoc network processing circuitry to form an ad hoc network with each of the other MESs, through which signals for the auto-negotiation are communicated.

8. The communication system of claim 1, wherein the one MES is configured to auto-discover a further MES and determine whether to add the further MES to the unit.

9. The communication system of claim 8, wherein at least the one MES is configured to broadcast heartbeat messages at regular periodic intervals, some of the heartbeat messages being indicative of a leader-election process for use by the further MES to be auto-discovered and other ones of the heartbeat messages identifying a said MES already operating as a leader MES to facilitate the auto-discovery.

10. The communication system of claim 1, wherein each of the MESs is configured to transmit status messages to at least one other one of the MESs.

11. The communication system of claim 1, wherein, when a status message or the absence of a status message from the one MES indicates that the one MES has failed, one of the remaining MESs is reconfigured in the leader mode as a result of a further auto-negotiation among the remaining MESs.

12. The communication system of claim 1, wherein the different locations are locations on a common mobile transporter.

13. The communication system of claim 1, wherein the one MES operating in the leader mode is configured to provide synchronization signals to the remaining MESs, and the remaining MESs are configured to use the synchronization signals to adjust respective phases of the satellite-related signals.

14. The communication system of claim 1, wherein:

each of the plurality of MESs is configured to obtain a signal quality metric by measuring signal quality of a downlink signal from the one or more satellites, and the auto-negotiation includes sharing, by each of the MESs, the obtained signal quality metric with the other MESs of the plurality of MESs; and in response to the signal quality metric obtained by the one MES operating in a leader mode being below a first threshold, and a remaining MES of the MESs obtaining a signal quality metric thereof above a second threshold, the one MES is reconfigured in the follower mode and the remaining MES is reconfigured in the leader mode.

15. A first mobile earth station (MES), among a plurality of MESs each including an antenna for direct communication with a satellite, the plurality of MESs being arranged at different locations and operational as a unit to communicate with one or more satellites, the first MES comprising:

an antenna for transmitting an uplink signal and/or receiving a downlink signal from the one or more satellites;

a transceiver front end coupled to the antenna;

a modem for transmitting and/or receiving data signals to/from external end user equipment;

memory; and a controller, coupled to the transceiver front end and the modem, operative to execute instructions read from the memory to:

auto-negotiate with remaining MESs of the plurality of MESs to determine which one of the MESs should operate in a leader mode;

configure the first MES in the leader mode and each of the remaining MESs in a follower mode based on a result of the auto-negotiation; and manage, when the first MES is configured in the leader mode, coherent combining/dividing of satellite-related signals communicated between the first MES and each of the remaining MESs, wherein the auto-negotiation is an initial auto-negotiation when the unit is initialized, and the result of the auto-negotiation is a determination that the one MES is to be initially configured in the leader mode by default, and wherein the one MES operating in the leader mode is configured to provide, to the remaining MESs, satellite channel configuration data including tuning, center frequency and/or symbol rate data.

16. The first MES of claim 15, further comprising:

a combiner/divider operative to combine the satellite-related signals, wherein each of the satellite-related signals is a baseband signal derived from a downlink satellite signal received by an associated remaining MES.

17. The first MES of claim 16, wherein the combining is performed in the digital domain.

18. The first MES of claim 16, wherein the combining is performed in the analog domain.

19. The first MES of claim 15, wherein the controller further manages dividing an uplink signal into a plurality of divided uplink signals from which uplink signals are derived for transmission to the one or more satellites.

20. The first MES of claim 15, further comprising:

a signal quality analyzer configured to obtain a signal quality metric by measuring signal quality of a downlink signal from the one or more satellites, wherein the auto-negotiation comprises sharing the signal quality metric with remaining MESs of the plurality of MESs; and in response to the signal quality metric obtained by the first MES operating in a leader mode being below a first threshold, and a remaining MES of the MESs obtaining a signal quality metric thereof above a second threshold, the controller reconfigures the first MES in the follower mode and communicates with the remaining MES which is reconfigured in the leader mode.

21. The first MES of claim 20, wherein the signal quality metric comprises absolute receive signal level, signal to noise ratio (SNR), signal to interference and noise (SINR), Energy per bit/Noise-spectral density (EbNo), Energy per symbol/Noise-spectral density (EsNo), Error Vector Magnitude (EVM), Bit Error Rate (BER), or any combination thereof.

22. The first MES of claim 15, further comprising synchronization circuitry to provide synchronization signals to the remaining MESs for adjusting respective phases of the satellite-related signals.

* * * * *